United States Patent
Moll (10) Patent No.: US 8,374,227 B2
(45) Date of Patent: Feb. 12, 2013

(54) DIGITAL SIGNAL ANALYSIS WITH EVALUATION OF SELECTED SIGNAL BITS

(75) Inventor: Joachim Moll, Herrenberg (DE)

(73) Assignee: Agilent Technologies, Inc., Santa Clara, CA (US)

( * ) Notice: Subject to any disclaimer, the term of this patent is extended or adjusted under 35 U.S.C. 154(b) by 969 days.

(21) Appl. No.: 12/011,089

(22) Filed: Jan. 24, 2008

(65) Prior Publication Data

US 2008/0181289 A1 Jul. 31, 2008

(30) Foreign Application Priority Data

Jan. 25, 2007 (EP) .................................... 07101164

(51) Int. Cl.
*H04B 3/46* (2006.01)
*H04B 17/00* (2006.01)
*H04Q 1/20* (2006.01)
(52) U.S. Cl. ......................................................... 375/224
(58) Field of Classification Search .................... 375/224
See application file for complete search history.

(56) References Cited

U.S. PATENT DOCUMENTS

| | | | |
|---|---|---|---|
| 3,562,710 A | 2/1971 | Halleck | |
| 5,726,991 A | 3/1998 | Chen et al. | |
| 6,151,689 A * | 11/2000 | Garcia et al. | 714/49 |
| 2004/0234014 A1 | 11/2004 | Chen | |
| 2005/0050419 A1 | 3/2005 | Kapur et al. | |
| 2005/0219366 A1 * | 10/2005 | Hollowbush et al. | 348/193 |
| 2005/0243638 A1 * | 11/2005 | Harrington et al. | 365/230.03 |
| 2006/0092979 A1 * | 5/2006 | Peng et al. | 370/474 |
| 2007/0083801 A1 * | 4/2007 | Kanbayashi | 714/724 |
| 2007/0226590 A1 * | 9/2007 | Nagai | 714/763 |
| 2007/0282556 A1 * | 12/2007 | Achkar et al. | 702/108 |
| 2008/0059102 A1 * | 3/2008 | Frankowsky et al. | 702/117 |

FOREIGN PATENT DOCUMENTS

| | | |
|---|---|---|
| EP | 1 582 885 A | 10/2005 |
| GB | 1385537 A | 2/1975 |
| WO | WO 00/11830 | 3/2000 |
| WO | WO 2004/032405 | 4/2004 |

OTHER PUBLICATIONS

European Search Report dated Jun. 27, 2007.

* cited by examiner

*Primary Examiner* — Erin File (57) ABSTRACT

The invention refers to analyzing a digitally modulated test signal received from a device under test -DUT-, comprising providing a first sampled signal by assigning a first sequence of digital values as result of a level comparison of the test signal with a first threshold at first successive timing points, generating a first masking signal indicating matches between a second sequence of digital values expected from the DUT and one or a plurality of first data patterns, and analyzing the first sampled signal in conjunction with the masking signal.

12 Claims, 3 Drawing Sheets

|   | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|----|----|----|----|----|----|----|----|----|----|----|
| S | 0 | 0 | 0 | 1 | 0 | 0 | 1 | 1 | 0 | 1  | 1  | 1  | 0  | 0  | 1  | 1  | 0  | 1  | 0  | 0  |
| M1| 0 | 0 | 0 | 0 | 1 | 0 | 0 | 0 | 0 | 1  | 0  | 0  | 0  | 0  | 0  | 0  | 0  | 1  | 1  | 0  |
| M2| 0 | 0 | 0 | 1 | 0 | 0 | 1 | 0 | 1 | 0  | 0  | 0  | 1  | 0  | 1  | 0  | 1  | 0  | 0  | 0  |

DIGITAL SIGNAL ANALYSIS WITH EVALUATION OF SELECTED SIGNAL BITS

BACKGROUND

The present invention relates to digital signal analyzing.

Characterizing the transient behavior of high-speed digital circuits, i.e. the transitions from a logical zero to a logical one and vice versa, has become increasingly important for designing as well as manufacturing such digital circuits. Timing problems can cause transmission errors, temporary or even permanent outage of an entire computing or communication system, and have to be avoided.

A standard characterization of digital circuits is the so-called Bit Error Ratio (BER) determination. Therefore, a received digital data signal is repetitively sampled at a defined sampling point. A sampling point is determined by a threshold value and by a relative time or time delay with respect to a clock signal associated to the data signal. The sampled values forming the sampled signal are each compared with corresponding values of an expected signal, and the ratio of erroneous bits to the total number of bits is determined.

Particularly, the BER depends on the quality of the received signal carrying the digital data. The signal quality significantly depends on characteristics of the transmission channel between the signal transmitter and the signal receiver. Such transmission channel, amongst others, might have low pass effects leading to data dependent distortions, e.g. to so-called inter-symbol interference -ISI- effects. Such effects often superpose with other distortions, e.g. random or periodic jitter that makes testing a signal transmitting device under test difficult. Especially, determining jitter properties directly from BER measurements of such received signal might lead to wrong results.

A further problem of testing a transmitting device is that in order to compensate for distortion effects of the communication channel, modern communication systems often use so-called pre- or de-emphasized signals. If these signals are measured directly at the output of the device, a deliberately distorted signal will be measured that might lead to wrong measurement results.

U.S. Pat. No. 5,726,991 A discloses an integral bit error rate test system.

DISCLOSURE OF THE INVENTION

It is an object of the invention to provide an improved digital signal analyzing. The object is solved by the independent claims. Preferred embodiments are shown by the dependent claims.

According to embodiments of the invention, a signal analyzer is provided for analyzing a test signal received from a device under test -DUT-. The test signal is a time- and value continuous physical signal generated by a signal driver of the DUT on the base of a sequence of digital values—the digital content—to be transmitted over a transmission line. For detecting the digital content of the test signal received from the DUT, the signal analyzer comprises a sampling circuit generating a first sampled signal by assigning digital values as result of a level comparison of the test signal with a defined first threshold at defined first successive timing points of a first timing or trigger signal. The first threshold and the first successive timing points might be chosen according to specifications. A plurality of different measurements at different thresholds and/or timing points might be performed as being described later on.

In the case of an error free detection within the analyzer, the first sampled signal equals the sequence of digital values being generated within the DUT. However, e.g. for compliance testing or for deriving jitter properties from the measuring result, the defined first threshold at defined first successive timing points might be chosen being located outside the data eye of the test signal, e.g. within in the regions of bit transitions, so that the first sampled signal will more or less differ from the DUT-generated sequence of digital values, in the following also being referred to as expected signal. The expected signal thereby generally represents a signal that is expected excluding certain errors, e.g. errors originating from the logic circuit of the DUT, errors originated from the DUT drivers, or errors induced on the transmission channel that might affect the test signal.

The analyzer further comprises a masking circuit that generates a masking signal indicating matches between the expected signal of digital values and one or a plurality of defined first data patterns. The masking circuit thereto searches for the data patterns within the expected data and generates for each detected match an indication within the masking signal. The masking circuit might receive the expected signal from external, e.g. stored within a data base or derived by processing data stored in a data base. For these cases, the expected signal might represent a digital sequence expected from an error-free DUT. Alternatively the expected signal might be generated by the analyzer from the received signal. Thereto, a second sampling circuit might be provided for sampling the test signal at optimum threshold and timing values. In this case, the expected signal might represent a signal that is transmitted error-free.

Embodiments of the invention thus allows for deriving masking signals of test signal based on long test patters not being readily stored in a data memory, e.g. signals algorithmically generated like PRBS based with an exemplary degree of $2^{31}-1$. Such masking signal might be generated in real time and might be processed together with the sampled signal detected in real time. Alternatively, the masking signal might be stored before being further processed.

The masking circuit might analyze the expected signal in one-bit steps, e.g. by means of a shift register storing an actual bit and a certain number of preceding bits and a logic for determining if the stored bits are similar to one of the first data patterns.

In a further embodiment, the masking signal is a digital sequence, wherein the bits indicating a pattern match have a first logical value, e.g. a logical "1", and the other bit values show the second logical value, e.g. a logical "0". The bit values not indicating the pattern match can be regarded as real time masking bits for masking the bits of the test signal to be ignored for the signal analysis.

In a further embodiment, for generating the first sampled signal, a first comparator is provided for comparing the test signal with a the first threshold value and providing a comparison signal as result of the comparison, said signal being a time continuous digital signal; i.e. a continuous signal showing either a low level (voltage or current) or a high level depending on the comparison. This signal is provided to a sampling circuit, e.g. a sampling flip flop that takes samples of the comparison signal at distinct time points, thereby generating a time discrete digital signal, or, in other words, a sequence of digital values or bits (i.e. a sequence out of a logical zero "0" values and logical one "1" values).

In a further embodiment, the analyzing circuit performs a comparison between the first sampled signal and the expected signal at bit positions being marked by the masking signal and disregards the values of the first sampled signals at bit positions not being marked. Thereby, the analyzing circuit might perform a bit error ratio -BER- measurement indicative of a number of occurrences of differences between values of the first sampled signal and the expected signal at bit positions related to a certain bit history within the expected signal. Thereby, the BER value might represent a ratio of the number of differences to a number of compared bits related such bit history. The bit history thereby might consist of any bits precedent with respect to an actual bit and might also comprise the actual bit itself.

As described above, digital signal to be transmitted over a transmission channel are often deliberately distorted at the signal transmitter in order to compensate for distortion effects of the transmission channel. Thereby the signal value of a certain number of bits before and/or after a transition might be affected.

Uncompensated pre- or de-emphasized digital signals substantially result in different signal transition swings depending on the bit history. A transition swing thereby represents a difference in signal levels before and after a transition. As an example, the signal might be emphasized such that each bit after a rising edge ("01"-transition) the signal level of the logical "1" is chosen to be higher compared to the level of other logical "1" bits, and each bit after a falling edge ("10"-transition) the signal level of the logical "0" is chosen to be lower compared to other logical "0" bits. Such modulation will also be referred to as pre-emphasis with one post cursor. Applying such pre-emphasis with one post cursor, two different transition swings are expected: if the signal shows two directly adjacent transitions, i.e. for history sequences of "101" (rising edge) or "010" (falling edge), a maximum or full swing is expected for the actual transition. Otherwise, in cases where the transition happens after a number of equal bits, i.e. for history sequences of "001" or "110", only a reduced swing is expected. Other history sequences, i.e. "000", "011", "100", "111" do not refer to any transition (between each the second and third bit).

As the different transitions show different timing characteristics, performing a BER analysis on the base of all transitions regardless of their history will lead to wrong results. In order to avoid such wrong results, separate BER analyses for the different bit histories are performed.

Referring to the pre-emphasis with one post cursor example, two measurement runs might be performed, whereby each a different masking signal is generated: in a first run, the transitions representing a full swing might be evaluated, and in a second run, transitions representing a reduced swing might be evaluated. Therefore, in the first run, the masking circuit might detect the bit histories referring to the full swing, i.e. the patterns "101" or "010 and providing a corresponding masking signal, wherein an occurrence of said patterns is indicated. In the second run, the masking circuit might detect the bit histories referring to the reduced swing, i.e. the patterns "001" or "110" and providing a corresponding second masking signal, wherein an occurrence of said patterns is indicated.

Alternatively to applying a pre-emphasis with one post cursor, multiple-bits post cursor might be applied. Instead or additionally a one bit pre-cursor or multiple-bits pre-cursors might be applied. Depending on the number of cursors, a number of different transitions (having e.g. different transition swings and transition timings) will occur. E.g. applying 4 cursors associated to each a different signal level, up to 8 different transitions might occur in the corresponding test signal. A corresponding number of different masking signals might be provided each for selecting one of the transitions.

In a further embodiment, an analysis of different masked signal is performed in parallel. Thereto, the masking of the first sampled signal with the different masking signals is performed in parallel by different circuits. Further the corresponding comparison with the expected signal and BER counting are performed in parallel. The number of parallel paths might depend on the number of masking patterns or on the number of transition types to be evaluated.

In a further embodiment, a timing circuit is provided for generating the first timing signal comprising a plurality of trigger points at the successive timing points with the same frequency as the clock pulses of a signal clock associated with the test signal.

In a further embodiment, the timing circuit comprises a clock recovery circuit that recovers the signal clock from the test signal. Alternatively, the signal clock is derived from a distinct clock signal associated to the test signal being received from remote (external clock). Further alternatively, the signal clock is derived from an internal clock having a defined frequency relation with respect to the data rate of the test signal. In an embodiment, a switch is provided to select the signal clock source among at least two of the above-described sources.

In a further embodiment, the signal analyzer further comprises a second digital sampling circuit, in the following also being referred to as reference path, for sampling the test signal, at the successive timing points of a second timing signal.

The reference path might be structurally similar to the first digital sampling circuit, comprising a second comparator for performing a two-level comparison between the test signal and a second threshold value and for providing a comparison signal indicating a result of the comparison, and a second capture device, e.g. a sampling flip flop, for deriving the sequence of comparison values by sampling the comparison signal.

In order to treat the resulting sequence of comparison values as expected data, the second threshold and the timing points of the second timing signals are chosen such that the test signal is sampled within a certain region being distant to the transition regions, preferably in the bit center region, i.e. in the center of the data eye of the data signal.

In a further embodiment, the signal analyzer comprises a switch for selecting one of the sequence derived by the reference path and a sequence being generated by an expected data generator, e.g. by means of an algorithm, or by encoding or scrambling stored data, as expected data to be provided to an input of a masking circuit 80 as well as to an input of an analyzing circuit 90.

In a further embodiment, the timing circuit is controlled to provide a variable phase shift (also being referred to as sampling time delay or time delay) to the first timing signal in relation to the signal clock. In order to derive a signal analysis over the time delay, a plurality of measurements is provided, whereby the time delay is varied after each measurement. This time delay might be varied to cover at least a fraction of a signal cycle (i.e. within the time duration of one bit of the test signal, being the inverse of the test signal data rate), thereby preferably covering the transition region within the signal cycle. The time delay thereby might be varied in equal timing steps.

In a further embodiment, BER measurements are provided separately for different transitions characterized by different histories, each for a plurality of different sampling times with respect to delay times, thereby providing so-called bathtub curves plotting BER values over the delay time. Thereby, jitter characteristics might be determined from the bathtub curves. As each bathtub curve relates a certain bit history, the different bathtub curves show significantly less influence of data dependent jitter -DDJ-. Thus from the form of each bathtub curve, the random jitter -RJ- and the periodic jitter -PJ- can be determined. The test signal might be based on a multiple repetition of a test sequence, e.g. a 1000-time repetition of a defined bit pattern, wherein the bit pattern might be a pseudo random bit sequence generated by a linear feedback shift register circuit, or any other pattern containing a plurality of frequency components and therewith suitable for timing test purposes.

Embodiments of the invention can be partly or entirely embodied or supported by one or more suitable software programs, which can be stored on or otherwise provided by any kind of data carrier, and which might be executed in or by any suitable data processing unit.

BRIEF DESCRIPTION OF DRAWINGS

Other objects and many of the attendant advantages of embodiments of the present invention will be readily appreciated and become better understood by reference to the following more detailed description of embodiments in connection with the accompanied drawings. Features that are substantially or functionally equal or similar will be referred to by the same reference signs.

Figure 1:
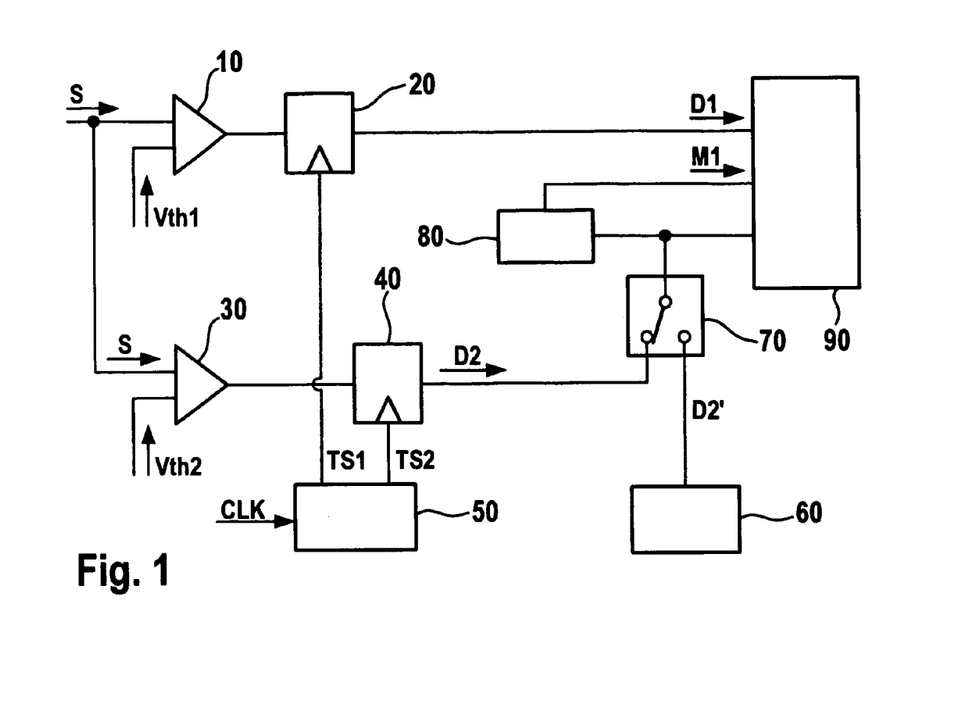
FIG. 1 shows a block diagram of an exemplary signal analyzer for analyzing a digital signal received from a DUT.

FIG. 1 shows a block diagram of a signal analyzer comprising a first digital sampling path, in the following also being referred to as data path, comprising a first comparator 10 and a first sampling flip flop (or sample & hold circuit) 20, and a second digital sampling path, in the following also being referred to as reference path, comprising a second comparator 30 and a second sampling flip flop 40.

A signal S is provided by a DUT (not shown) to both a first input of the first and second comparator 10 and 30. The first comparator 10 receives a first threshold voltage Vth1 at its second input, compares the received signal S with the first threshold voltage Vth1 and generates a continuous comparison signal being provided to a data input of the first sampling flip flop 20. The comparison thereby shows a first level value (e.g. a low voltage level), if the corresponding comparison result is below the threshold and shows a second level value (e.g. a high voltage level "1", if the comparison result is above the threshold.

Alternatively, the signal S might be a differential signal comprising two complementary signals transmitted over a differential transmission line. In this case, both signals are provided each to corresponding inputs of corresponding differential comparators. The comparators might generate either single comparator output signals or differential comparator output signals, and the further processing within the analyzer might be based on the single comparator output signals or on the differential comparator output signal correspondingly.

The second comparator 30 receives a second threshold voltage Vth2 at its second input, compares the received signal S with the second threshold voltage Vth2 and generates a second two-level comparison signal being provided to a data input of the second sampling flip flop 40. Thereby, the second threshold voltage Vth2 might be a constant voltage (e.g. representing a mean value between the low signal level representing a bit value of "0" and the high signal level representing a bit value of "1", also being referred to as 50% level), or a dynamic threshold as e.g. applied in so-called decision feedback equalization (DFE). Differently the first threshold voltage Vth1 might be a tunable voltage in order to vary the threshold being a test parameter of the data path or a dynamic threshold with a corresponding offset.

The first sampling flip flop 20 receives at its trigger input a first timing signal TS1 comprising a series of first trigger points, so that the comparison signal is sampled at defined successive first timing points, thereby providing a first sampled signal D1 at its output (thereby the trigger points might be positive or negative edges of the timing signal, depending on the kind of trigger input of the sampling flip flop). The second sampling flip flop 40 receives at its trigger input a second timing signal TS2 comprising a series of second trigger points, so that the comparison signal is sampled at defined successive second timing points thereby providing a second sampled signal D2 at its output.

The timing circuit 50 receives a clock signal CLK associated to the test signal S, and derives therefrom the first and second timing signals TS1 and TS2. The timing signals thereby might be generated such that the frequency of occurrences of their trigger points are equal or at least substantially equal to the clock signal frequency.

Thereby, the trigger points of the second timing signal TS2 are preferably placed within the center of the test signal data eye (i.e. at equidistant time points within each the center of the bits of the test signal. Applying a most likely second threshold value, e.g. the 50% voltage as mentioned above, the corresponding second sequence of digital values represent an expected signal D2 being expected to be received by the analyzer in case of an error free signal transmission between the DUT and the analyzer.

Further, the signal analyzer comprises a switch 70 for selecting one of the sequence D2 derived by the reference path 30 and 40 and a sequence D2' being provided by an expected data generator 60, e.g. being algorithmically generated, or being generated by encoding stored data (e.g. applying a so-called 8B10B or 66/64 coding) or scrambling stored data, to be provided as expected data to an input of a masking circuit 80 as well as to an input of an analyzing circuit 90.

The trigger points of the first timing signal TS1 might be variable with respect to signal clock CLK. Therefore, the timing circuit 50 might comprise a tunable delay circuit. This allows performing measurements at different time positions within the data eye of the test signal. Further, the first threshold voltage Vth1 might be variable. Varying both the threshold voltage Vth1 and the trigger delay allows performing e.g. test at critical points within the data eye or determining a three-dimensional function of a BER value in dependence of both the threshold voltage and the delay time. Further, a so-called bathtub curve might be provided by keeping the second threshold voltage constant and varying the delay time, thereby plotting a measured BER value over the delay time.

The masking circuit 80 receives the expected signal D2 or D2' and analyzes whether one or a plurality of defined first data patterns match with a certain number of preceding bits, thereby providing a first masking signal M1. The first masking signal M1 might consist of a sequence of multi-bit values, if it combines a plurality of analyzing results.

The first masking signal M1 generated in response to the expected signal D2 or D2' might be a digital sequence, wherein the bits indicating a pattern match have a first logical value, e.g. a logical "1", and the other bit values show the second logical value, e.g. a logical "0".

The analyzing circuit 90 receives the first sampled signal D1, the expected signal D2 or D2' and the masking signal M and provides an analysis based on these three signals. Thereby, the analyzing circuit 90 might perform a comparison between the first sampled signal D1 and the expected signal D2 at bit positions being marked by the masking signal M, thereby disregarding the values of the signals to be compared at bit positions not being marked. The bit values not indicating the pattern match can be regarded as real time masking bits for masking the bits of the test signal to be ignored for the signal analysis. Properly defining the data patters of the masking circuit 80 allows for performing a test signal analysis independent from the bit history of the test signal.

Specifically, the analyzing circuit might perform a bit error ratio -BER- measurement indicative of a number of occurrences of differences between values of the first sampled signal D1 and the expected signal D2 at bit positions related to a certain bit history within the expected signal D2. Thereby, the BER value might represent a ratio of the number of differences to a number of compared bits with such bit history.

Figure 3:
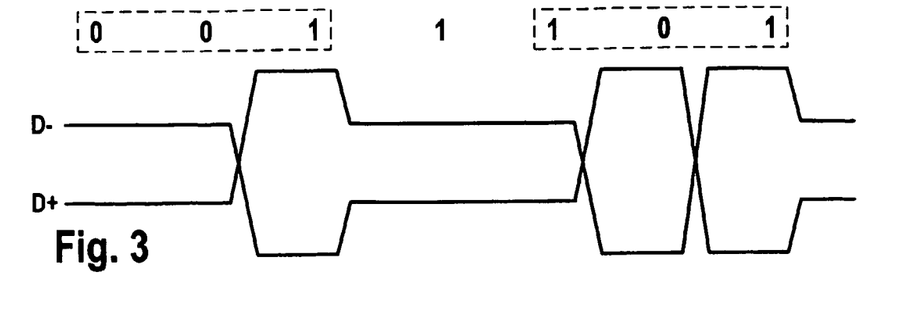
FIG. 3 shows en example of a pre-emphasized/de-emphasized digital signal to be analyzed.

As discussed above, the analyzer might have to analyze a pre-emphasized signal. In the following, as example for a pre-emphasizing modulation, each bit after a rising edge ("01"-transition) the signal level of the logical "1" is generated to be higher compared to the level of other logical "1" bits, and for each bit after a falling edge ("10"-transition) the signal level of the logical "0" is generated to be lower compared to other logical "0" bits as shown in FIG. 3. For such signals, two different transition swings are expected: if the signal shows two directly adjacent transitions, i.e. for history sequences of "101" (rising edge) or "010" (falling edge), a maximum or full swing is expected for the actual transition. Otherwise, in cases where the transition happens after a number of equal bits, i.e. for history sequences of "001" or "110", only a reduced swing is expected. Other history sequences, i.e. "000", "011", "100", "111" do not refer to any transition, and therefore might be ignored e.g. for bathtub measurement. However for determining an eye diagram these sequences should be taken into account as well. The analysis might be performed sequentially, in parallel, or partly sequentially and parallel.

Figure 2:
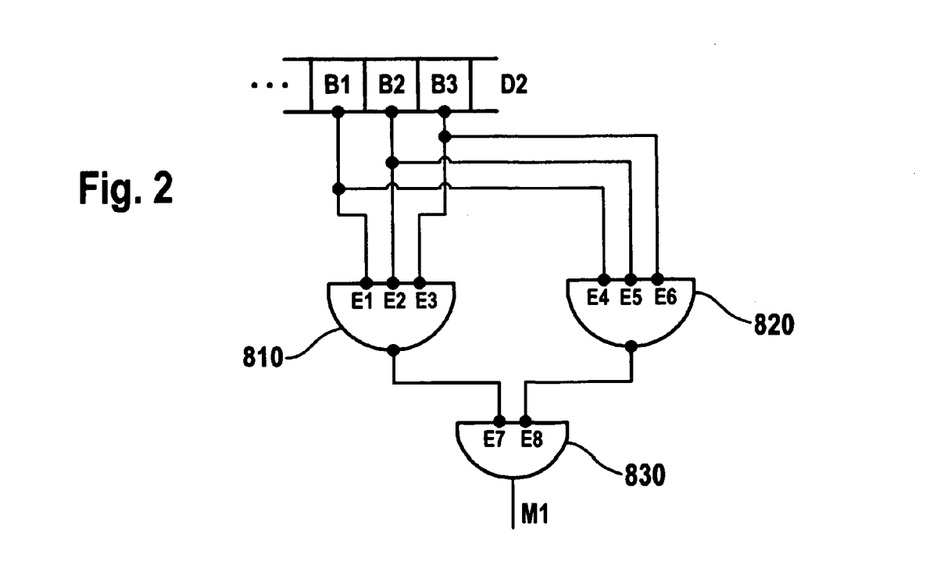
FIG. 2 shows a block diagram of an exemplary masking circuit of the signal analyzer of FIG. 1.

FIG. 2 thereto shows a block diagram of an exemplary masking circuit 80 of the signal analyzer of FIG. 1 for detecting the reduced swing transitions within the test signal S. The masking circuit 80 comprises a first AND gate 810 having a first, second and third input E1-E3, a second AND-gate 820 having a forth, fifths and sixth input E4-E6 and an OR-gate 830 have two inputs E7 and E8. The first input E1 and the forth input E4 are connected for receiving a first bit B1, the second input E2 and the fifth input E5 are connected for receiving a second bit B2, and the third input E3 and the sixth input E6 are connected for receiving a third bit B3 of the expected signal D2. The first input E1, the second input E2, and the sixth input E6 are so-called inverted inputs that toggle received values. The outputs of the first and second AND-gates 810 and 820 are connected each to the inputs E7 and E8 of the OR-gate 830 that provides the first masking signal M1 at its output. The masking signal M consequently detects both the patterns or history sequences "001" and "110" within the test signal and generates a "1" value upon each detection and a "0" otherwise.

By properly selecting different inputs E1-E6 to be inverted, a second masking signal M2 indicating the full swing transitions "101" and "010" might be generated. The first and second masking signal thereby might be generated sequentially by one masking circuit 80 or in parallel by two masking circuits. The first and second masking signal might be combined to one combined masking signal.

FIG. 3 shows a differential signal comprising a first signal D+ and a complementary signal D− with one post cursor pre-emphasis. Exemplarily, a bit sequence 0011101 is shown comprising a first rising edge ("01"-transition) between the second and the third bit and a second rising edge between the sixth and the seventh bit. As can be seen, for the first signal D+, the signal level of the first "1"-bit after both rising edge is higher compared to the level of other "1" bits, e.g. of the forth and fifth "1"-bits. Correspondingly, for the complementary signal D−, the signal level of the third and of the sixth "1"-bit is lower compared to the forth and fifth "1"-bits. The history of the first "01" transition is "0" and the history of the second 01 transition is "1"; the corresponding data pattern are "001" and "101" correspondingly. It can be seen that the first transition has a reduced swing compared to the second transition.

Figure 4:
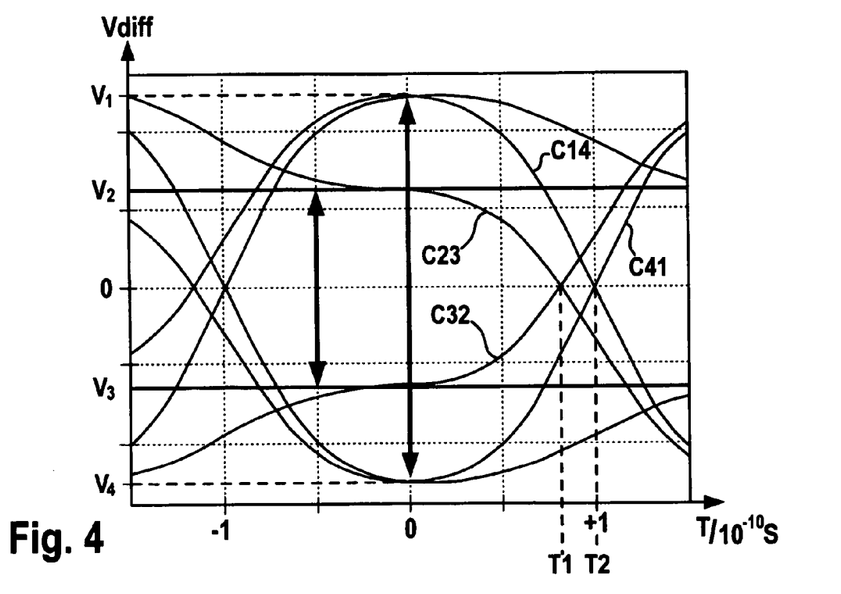
FIG. 4 shows an eye diagram of the pre-emphasized/de-emphasized digital signal.

FIG. 4 shows an eye diagram of a signal, of which an exemplary section is depicted in FIG. 3 as differential voltage VDIFF over the relative bit time T. The differential voltage VDIFF indicates the voltage difference between the differential signals D+ and D−. At the time T=0 at the middle of the data eye, the voltage difference VDIFF shows different voltage values V1-V4. Regarding e.g. the right part of the eye diagram, full swing transition curves C14 and C41 relate to transitions between the highest voltage V1 and the lowest voltage level V4 and vice versa respectively. By way of example the first full swing transition curve C14 might relate to a "10" transition of D+ or to a "01" transition of D−, and the second full transition curve V41 might relate to a "10" transition of D− or to a "01" transition of D+. Both curves intersect at the time T2 (T=1.0 exp−10). Reduced swing transition curves C23 and C32 relate to transitions between the second highest voltage V2 and the second lowest voltage level V3 and vice versa respectively. The first reduced swing transition curve C23 might relate to a "10" transition of D+ or a "01" transition of D−, and the second full transition curve V32 might relate to a "10" transition of D− or a "01" transition of D+. Both curves intersect at the time T1 (T≈0.8 exp−10). As can be seen from the diagram, the voltage distortion due to the pre-emphasis leads to a time distortion of the transitions.

Referring now to the pre-emphasis example with one post cursor described above, measurements might be performed in two steps, based each on the first masking signal M1 and the second masking signals M2 respectively. These steps might be performed in parallel or in subsequent measurement runs.

Further, positive and negative transitions might be evaluated in parallel.

Figure 5:
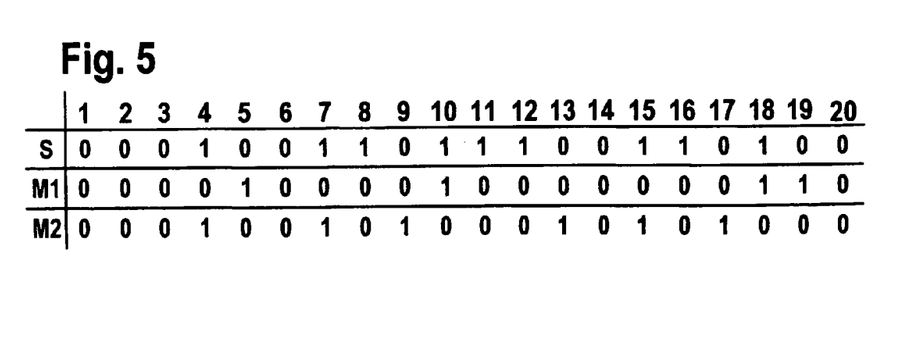
FIG. 5 shows an exemplary data sequence and corresponding masking data.

Thereto, FIG. 5 shows a table comprising an exemplary section of 20 bits numbered 1-20 out of an exemplary expected signal D2 and two corresponding masking signals M1 and M2. The first masking signal M1 refers to reduced swing transitions (bits 5, 10, 18, 19) within the test signal S and the second masking signal M2 refers to full swing transitions (bits 4, 7, 9, 13, 15, 17).

In the first step, the transitions representing the reduced swing might be regarded.

The masking circuit 80 therefore detects "001" and "110" patterns within the expected signal D2 and generated the first masking signal M1 indicating those transitions by generating a high level or "1" bit at the corresponding bit positions 5, 10, 18, 19 and a low level or "0" bit at the other positions. The analyzing circuit 90 performs a comparison between the bit values of the expected signal D2 and the first sampled signal D1 only at the bit positions indicated by the "1" bits of the first masking signal M1.

In a second step, transitions representing a full swing might be regarded.

The masking circuit 80 therefore detects "101" and "010" patterns within the expected signal D2 and generated the second masking signal M1 indicating those transitions by generating a high level or "1" bit at the corresponding bit positions 4, 7, 9, 13, 15, 17 and a low level or "0" bit at the other positions. The analyzing circuit 90 performs a comparison between the bit values of the expected signal D2 or D2' and the first sampled signal D1 only at the bit positions indicated by the "1" bits of the second masking signal M2.

Within both steps, separate BER measurements might be performed. Within each of the BER measurements, BER values might be determined indicating each the number of detected errors (i.e. the number of comparisons wherein the compared bits are different) to the overall number of comparisons relating to a specific sampling point.

In order to derive characteristics of the received signal S, e.g. jitter characteristics, it is known to plot a so-called bathtub curve by varying (in small steps) the sample delay time (or time delay) T, determining the corresponding BER values and plotting these values over the time T. As known in the art, jitter characteristics can be derived by evaluating the bathtub curve, e.g. by determining slope values or by performing a so-called tail fitting. However, if data dependent time distortions occur, the time distortions will overlay with the non data dependent jitter. Therewith, wrong jitter results might be derived, if the bathtub curve is based on different types of transitions, e.g. on all the transitions comprising the full swing and reduced swing transitions.

An advantage of the invention is that bathtub curves might be derived that are each based on the same types of transition, or generally, on transitions with the same relevant bit histories. By separately analyzing the curves relating to different transition types (full swing transitions and reduces swing transitions according to the above example) the BER values over the delay of the sampling time, separate bathtub curves are derived that are not being affected by timing distortions as described above. For deriving jitter characteristics of the test signal, a jitter analysis might be performed on the base of one of such bathtub curves or by combining the results of the analyses of different bathtub curves.

A further advantage is that differently to deriving the BER values on the base of comparing all bits irrespective whether transitions occurred or not, the derived bathtub curves exactly describe the BER value over the sampling time also in time regions beyond the transition.

Generally speaking, separate BER measurements might be performed for a test signal S having data dependent jitter. Therefore, in an initial step, the relevant bit history length, i.e. a number of subsequent bits influencing an actual transition, can be determined. The bit history thereby might consist of any bits precedent with respect to an actual bit and might also comprise the actual bit itself.

Depending on the kind of data dependent disturbances (e.g. inter-symbol-interference -ISI- or pre-emphasis), different history length might be regarded. If the bit history comprises a sufficient number of bits, the corresponding bathtub curves does not show any influence of data dependent disturbances. E.g. in order to determine the history length of ISI, sampled values of repetitive measurements are sorted or binned according to their bit history, e.g. binned to two different groups each related to one history of a one bit sequence. Such binning is further extended to longer history as long as they show different characteristics.

From these curves, non data dependent jitter parts, e.g. periodic jitter PJ and random jitter RJ can be further separated. The data dependent jitter DDJ might be determined by a comparison of the timings of the bathtub curves plotted for different bit histories.

As bathtub curves related to a certain pattern only relates to transitions relating to a single bit history (or to a number of bit histories relating to transitions with similar characteristics), a precise bathtub can be generated from just one edge of the compared bits and mirroring it to the other edge. This reduces the necessary test time compared to the time needed for measuring both edges.

Alternatively to analyzing (two level) digital signals, the invention can also be applied to multi-level signals, e.g. to two-bit pulse amplitude modulated -PAM- signals, e.g. to PAM 4 signals having four levels. Instead of two principal transitions (rising edges and falling edges) PAM 4 signals have 12 principal transitions. Such signals might be sampled using 3 different thresholds, whereby corresponding comparisons might be performed sequentially (one comparator sequentially adjusted to different thresholds) or in parallel (by means of a plurality of comparators adjusted to different thresholds).

Figure 6:
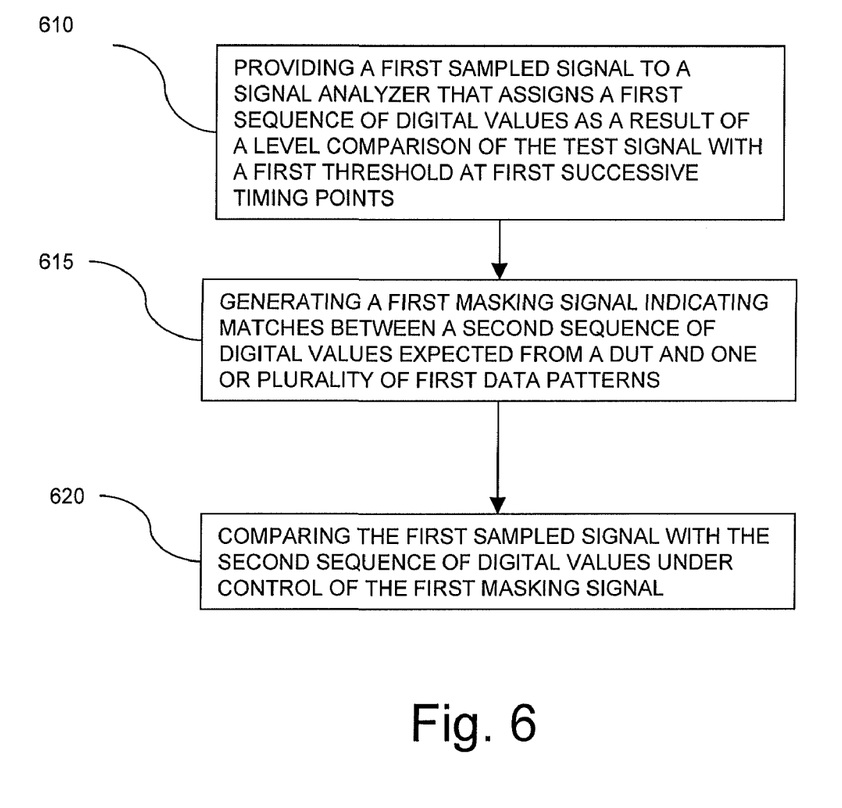
FIG. 6 shows a flow diagram of an exemplary embodiment.

A method of analyzing a test signal is shown in FIG. 6. The method comprises providing a first sampled signal to a signal analyzer that assigns a first sequence of digital values as result of a level comparison of the test signal with a first threshold at first successive timing points, as shown in block 610. The method also includes generating a first masking signal indicating matches between a second sequence of digital values expected from a DUT and one or plurality of first data patterns, as shown in block 615. The method further includes comparing the first sampled signal with the second sequence of digital values under control of the first masking signal, as shown in block 620.

Figure 7:
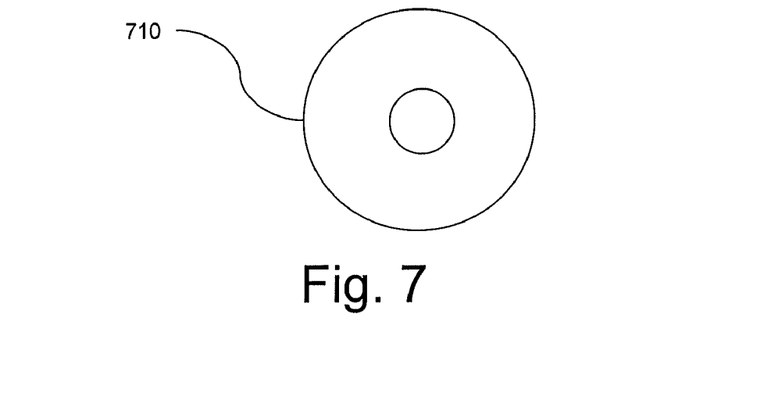
FIG. 7 shows an embodiment stored on an exemplary non-transitory data carrier.

FIG. 7 shows an embodiment stored on an exemplary non-transitory data carrier 710.

The invention claimed is:

1. A signal analyzer for analyzing a test signal received from a device under test (DUT), comprising:
 a first sampling circuit adapted for providing a first sampled signal by assigning a first sequence of digital values as result of a level comparison of the test signal with a first threshold at first successive timing points,
 a masking circuit adapted for generating a first masking signal, wherein the masking circuit is adapted for generating the first masking signal indicating matches between a plurality of preceding bits of a second sequence of digital values expected from the DUT and one or a plurality of first data patterns, and
 an analyzing circuit adapted for comparing the first sampled signal with the second sequence of digital values at bit positions marked by the masking signal.

2. The signal analyzer of claim 1, wherein the analyzing circuit is adapted for performing a comparison between the first sequence of digital values and the second sequence of digital values, and deriving an error value indicative of a number of occurrences of differences between values of said first and second sequence at the bit positions marked by the masking signal.

3. The signal analyzer of claim 2, wherein the analysis comprises deriving a bit error ratio (BER) value representing a ratio of said number differences to a number of the bit positions marked by the masking signal.

4. The signal analyzer of claim 3, further comprising a timing circuit adapted for generating a first timing signal comprising the first successive timing points, whereby the successive timing points have the same frequency as the clock pulses of a signal clock associated with the test signal, and a tunable delay line for providing a variable time delay to the first timing signal in relation to the signal clock, whereby the signal analyzer is adapted for performing the analysis at a plurality different time delay values.

5. The signal analyzer of claim 4, further being adapted to generate, by plotting the BER values over the time delay, a bathtub curve, and to derive a non data dependent jitter characteristic of the test signal from the plotted bathtub curve.

6. The signal analyzer of claim 4, wherein the signal analyzer is adapted to derive the signal clock from at least one of:
- an interface being adapted for receiving a clock signal associated to the test signal from remote,
- a clock recovery circuit that recovers the signal clock from the test signal, and
- an internal clock having a defined frequency relation with respect to the data rate of the test signal.

7. The signal analyzer of claim 1, further comprising a second sampling circuit adapted for providing the second sequence as result of a level comparison of the test signal with a second threshold at second successive timing points, whereby the second successive timing points are preferably positioned within the center of a data eye of the test signal.

8. The signal analyzer of claim 1, wherein the masking circuit is adapted to generate the masking signal being a third sequence of digital values, wherein the digital values of said sequence show a first value, if the preceding bits of the test signal match with one of the one or plurality of first patterns, and otherwise show a second value.

9. The signal analyzer of claim 1, wherein the masking circuit is adapted for further detecting one or a plurality of second data patterns within the test signal, and for generating a second masking signal indicating matches between the test signal and the one or plurality of second data patterns, whereby the one or a plurality of first and second patterns represent transitions with different characteristics within the test signal.

10. The signal analyzer of claim 1, further comprising a second sampling circuit adapted for generating the expected signal by assigning a second sequence of digital values as result of a level comparison of the test signal with a second threshold at successive timing points of a second timing signal, whereby the successive timing points of said second timing signal are positioned within the center of a data eye of the test signal.

11. A method of analyzing a test signal, comprising:
providing a first sampled signal to signal analyzer circuitry that assigns a first sequence of digital values as result of a level comparison of the test signal with a first threshold at first successive timing points,
generating a first masking signal indicating matches between a plurality of bits of a second sequence of digital values expected from a device under test and one or a plurality of first data patterns, and
comparing the first sampled signal with the second sequence of digital values at bit positions marked by first masking signal.

12. A software program or product, stored on anon-transitory data carrier, for executing the method of claim 11, when run on a data processing system.

* * * * *

UNITED STATES PATENT AND TRADEMARK OFFICE
CERTIFICATE OF CORRECTION

PATENT NO. : 8,374,227 B2
APPLICATION NO. : 12/011089
DATED : February 12, 2013
INVENTOR(S) : Joachim Moll Page 1 of 1

It is certified that error appears in the above-identified patent and that said Letters Patent is hereby corrected as shown below:

In the Specifications:

In column 1, line 5, Above "BACKGROUND" insert -- This application claims priority from European Patent Application, No. EP07101164.7 filed on 25 January 2007, which is incorporated by reference in its entirety. --.

Signed and Sealed this
Seventh Day of May, 2013

Teresa Stanek Rea
*Acting Director of the United States Patent and Trademark Office*